US012704916B2

(12) United States Patent
Kim et al.

(10) Patent No.: US 12,704,916 B2
(45) Date of Patent: Aug. 11, 2026

(54) DISPLAY OPERATION DEVICE AND VEHICLE INCLUDING THE SAME

(71) Applicant: HYUNDAI MOBIS CO., LTD., Seoul (KR)

(72) Inventors: Jae Min Kim, Yongin-si (KR); Shin Yeong Kim, Yongin-si (KR); Sung Goo Lee, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 19/035,276

(22) Filed: Jan. 23, 2025

(65) Prior Publication Data

US 2025/0383727 A1 Dec. 18, 2025

(30) Foreign Application Priority Data

Jun. 17, 2024 (KR) ........................ 10-2024-0078164

(51) Int. Cl.
*G06F 3/0362* (2013.01)
*B60K 35/10* (2024.01)
*G06F 3/041* (2006.01)
*B60K 35/22* (2024.01)

(52) U.S. Cl.
CPC ............ *G06F 3/0362* (2013.01); *G06F 3/041* (2013.01); *B60K 35/10* (2024.01); *B60K 35/22* (2024.01); *B60K 2360/1434* (2024.01)

(58) Field of Classification Search
CPC ....... G06F 3/0362; G06F 3/041; B60K 35/10; B60K 35/22; B60K 2360/1434
See application file for complete search history.

(56) References Cited

U.S. PATENT DOCUMENTS

2016/0320939 A1* 11/2016 Min .................... G06F 3/04883
2017/0010675 A1* 1/2017 Lee ........................ B60K 35/10
2017/0269768 A1* 9/2017 Shin ...................... G06F 3/0338
2018/0116904 A1* 5/2018 Lieberman ............. A61H 19/34
2018/0364816 A1* 12/2018 Krause .................. G06F 3/0362
2018/0373350 A1* 12/2018 Rao ......................... G06F 3/016
2019/0337389 A1* 11/2019 Barvesten .............. B60K 35/22
2022/0274211 A1* 9/2022 Saito .................. B23K 26/0738

FOREIGN PATENT DOCUMENTS

DE 102014011164 A1 1/2016
WO 2016/012464 A1 1/2016
WO 2023/083503 A1 5/2023

OTHER PUBLICATIONS

Extended European Search Report dated Aug. 19, 2025 issued in European Patent Application No. 25157584.1.

* cited by examiner

*Primary Examiner* — Md Saiful A Siddiqui
(74) *Attorney, Agent, or Firm* — Morgan Lewis & Bockius LLP

(57) ABSTRACT

A display operation device includes a cover glass configured to cover a front surface of a display panel including a touch area, and a knob attached to a position corresponding to the touch area on a front surface of the cover glass. The knob includes a boundary portion along a circumference of the knob to demarcate a boundary with the display panel, and a flat touch portion inside the boundary portion. The display operation device can provide a user with appropriate operating feeling while facilitating the operation (or manipulation) of a display through the shape of the knob attached to the cover glass formed to cover the front surface of the display panel.

8 Claims, 6 Drawing Sheets

DISPLAY OPERATION DEVICE AND VEHICLE INCLUDING THE SAME

This application claims the benefit of Korean Patent Application No. 10-2024-0078164, filed on Jun. 17, 2024, which is hereby incorporated by reference as if fully set forth herein.

BACKGROUND OF THE DISCLOSURE

Field of the Disclosure

Embodiments of the present disclosure relate to a display operation device that can easily manipulate a display while providing a user with appropriate tactile feedback, and a vehicle including the same.

Discussion of the Related Art

A center fascia display of a vehicle may display various visual information about the vehicle. Such a display device may also be installed on a dashboard of a vehicle disposed in front of a driver's seat and a front passenger seat, and provides various convenience information such as navigation, vehicle management and operation, Internet, and entertainment.

Recently, display devices mounted on vehicles have been implemented as various types of touch-based screens, for example, a navigation system, a vehicle air-conditioning system, an audio interface, etc. that can operate by user's touch actions. In addition, the size of the display is also gradually increasing, and is installed at various positions such as not only a center fascia but also a center console.

Accordingly, more information can be displayed on the display. The number of physical operating (manipulation) systems (e.g., buttons or dials) installed in vehicles is decreasing as the application of virtual buttons or virtual dials rapidly increases due to the application of touch-screens.

However, since virtual buttons or virtual dials displayed on the touchscreen are displayed on a flat display, there are many problems in use due to touch misrecognition as well as a lower manipulation feeling than physical operating systems.

Therefore, there is a need for a means for maintaining the manipulation convenience and aesthetics of a touch-based display device while also maintaining advantages of the physical manipulation systems.

SUMMARY OF THE DISCLOSURE

An object of the present disclosure is to provide a display operation device and a vehicle including the same. More particularly, the present disclosure relates to a display operation device that provides a user with appropriate operating feeling while facilitating the operation (or manipulation) of a display through the shape of a knob attached to a cover glass formed to cover a front surface of a display panel, and also relates to a vehicle including the display operation device.

Another object of the present disclosure is to provide a display operation device for enabling a user to touch/operate a display using a touch area of a display panel of the display without using an additional structure, and a vehicle including the same.

Another object of the present disclosure is to provide a display operation device capable of implementing a seamless design by forming a knob from the same material as the cover glass, and a vehicle including the same.

Technical subjects to be solved by the present disclosure are not limited to the above-mentioned technical solutions, and it should be noted that other technical subjects not described above can be understood by those skilled in the art from the description of the present disclosure below.

In accordance with an embodiment of the present disclosure, a display operation device may include: a cover glass configured to cover a front surface of a display panel including a touch area; and a knob on a front surface of the cover glass, the knob is attached to a position corresponding to the touch area. The knob includes: a boundary portion along a circumference of the knob to demarcate a boundary with the display panel; and a flat touch portion inside the boundary portion.

The flat touch portion may have a predetermined thickness to enable recognition of a user's contact in the touch area when the user touches the flat touch portion.

The knob may include the same material as the cover glass.

The boundary portion may have a convex shape so as to protrude more than the flat touch portion, or the boundary portion may have a concave shape so as to be recessed more than the flat touch portion.

The flat touch portion may include: a first touch portion at a center portion of the flat touch portion; a second touch portion outside the first touch portion; and a guide portion between the first touch portion and the second touch portion to demarcate a boundary between the first touch portion and the second touch portion.

The guide portion may have a convex shape so as to protrude more than the first touch portion and the second touch portion, or the guide portion may have a concave shape so as to be recessed more than the first touch portion and the second touch portion.

The knob may include a structure having a circular shape; and the touch area is configured to recognize a contact action of a user who contacts a curved trajectory through the flat touch portion.

The touch area may recognize a number of times the user touches the touch portion and a duration of the user touching the flat touch portion.

The knob may include a structure having a polygonal shape; and the touch area may recognize a contact of a user who touches a straight trajectory through the flat touch portion.

In accordance with another embodiment of the present disclosure, a vehicle may include: a vehicle body; a holder located at the vehicle body; a display panel mounted on the holder and including a touch area; and a display operation device located at a front surface of the display panel. The display operation device includes: a cover glass covering the front surface of the display panel; and a knob on a front surface of the cover glass, the knob is attached to a position corresponding to the touch area. The knob includes: a boundary portion along a circumference of the knob to demarcate a boundary with the display panel; and a flat touch portion inside the boundary portion.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure.

DETAILED DESCRIPTION OF THE DISCLOSURE

Description will now be given in detail according to exemplary embodiments disclosed herein, with reference to the accompanying drawings. The same or equivalent components may be provided with the same reference numbers, and description thereof will not be repeated. As used herein, the suffixes "module" and "part" are added or used interchangeably to facilitate preparation of this specification and are not intended to suggest distinct meanings or functions. In describing embodiments disclosed in this specification, relevant well-known technologies may not be described in detail in order not to obscure the subject matter of the embodiments disclosed in this specification. In addition, it should be noted that the accompanying drawings are only for easy understanding of the embodiments disclosed in the present specification, and should not be construed as limiting the technical spirit disclosed in the present specification. As such, the present disclosure should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, it will be understood that when an element is referred to as being "directly connected with" another element, there are no intervening elements present.

A singular representation may include a plural representation unless it represents a definitely different meaning from the context.

The terms such as "include" or "have" used herein are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Figure 1:
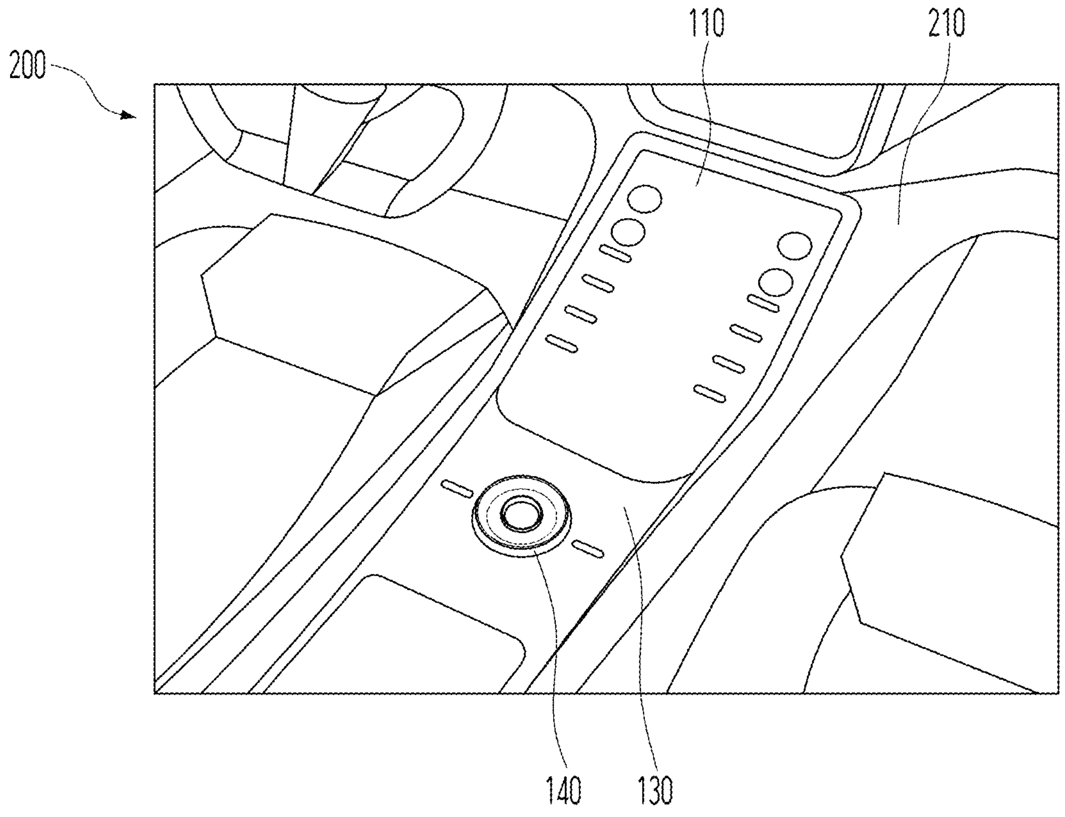
FIG. 1 is a diagram illustrating an example of a vehicle including a display operation device according to an embodiment of the present disclosure.
Figure 2:
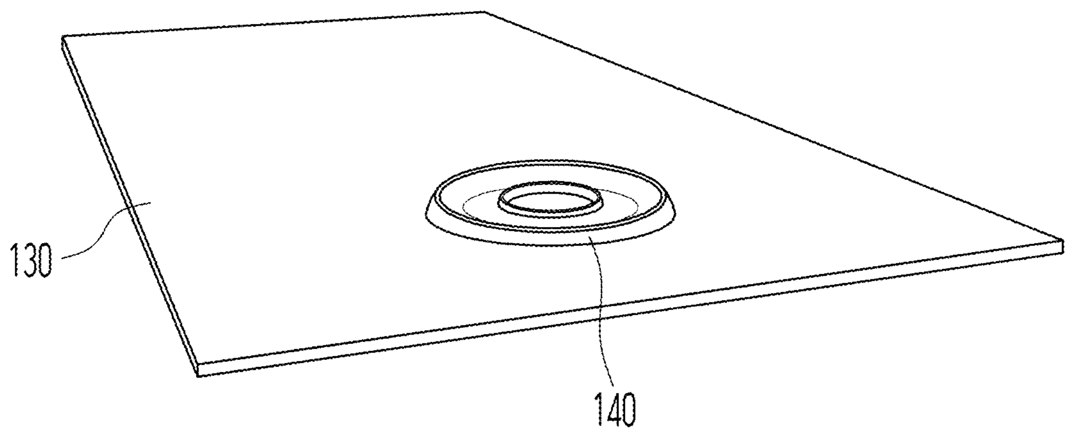
FIG. 2 is a diagram illustrating an example of a knob attached to a front surface of a cover glass in the display operation device according to an embodiment of the present disclosure.
Figure 3:
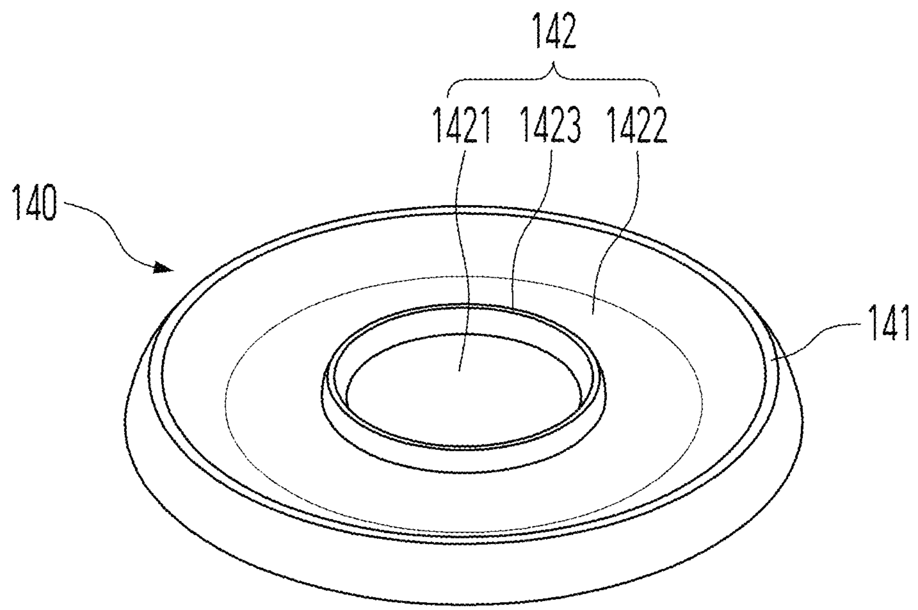
FIG. 3 is a diagram illustrating an example shape of a knob in the display operation device according to an embodiment of the present disclosure.
Figure 4:
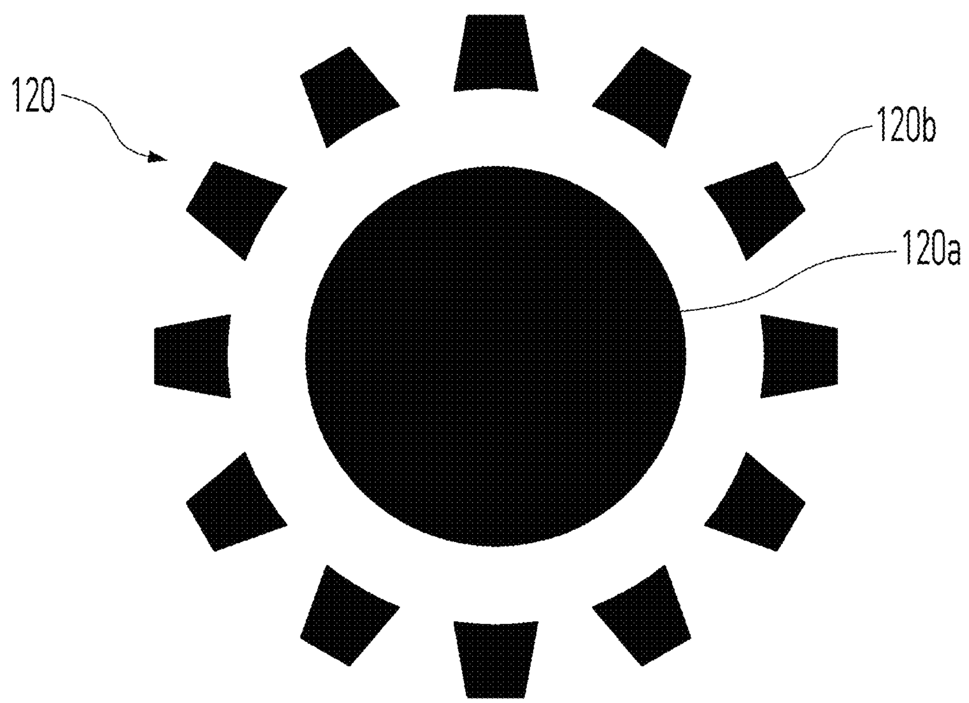
FIG. 4 is a diagram illustrating examples of touch areas in the display operation device according to an embodiment of the present disclosure.
Figure 5:
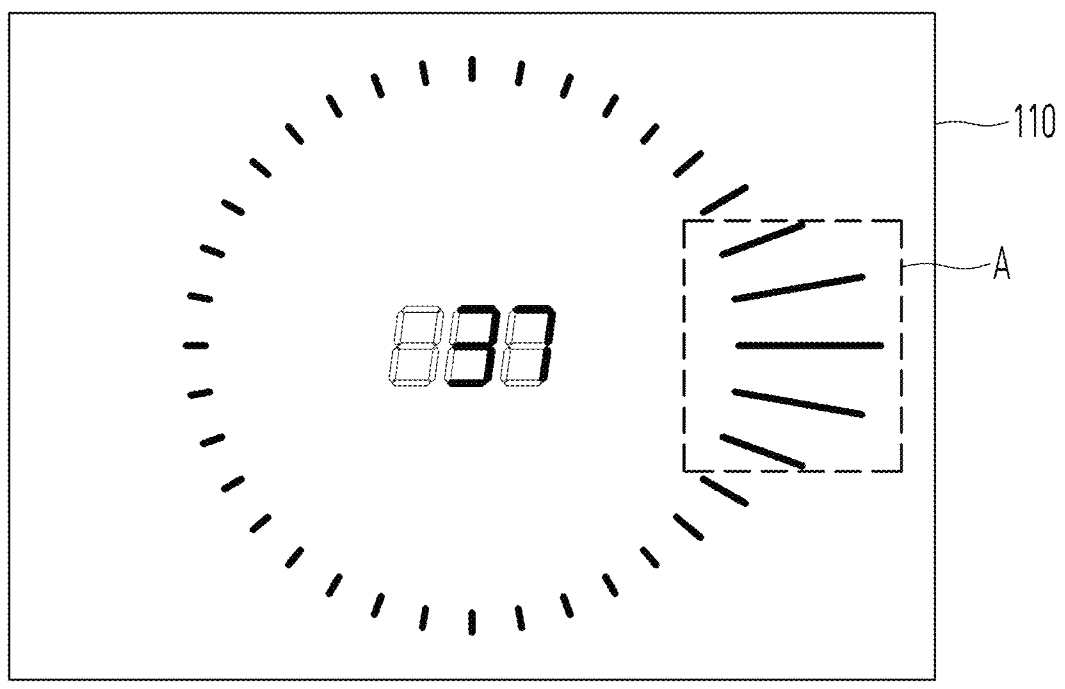
FIG. 5 is a diagram illustrating an example of a screen that is output through a display panel in the display operation device according to an embodiment of the present disclosure.
Figure 6:
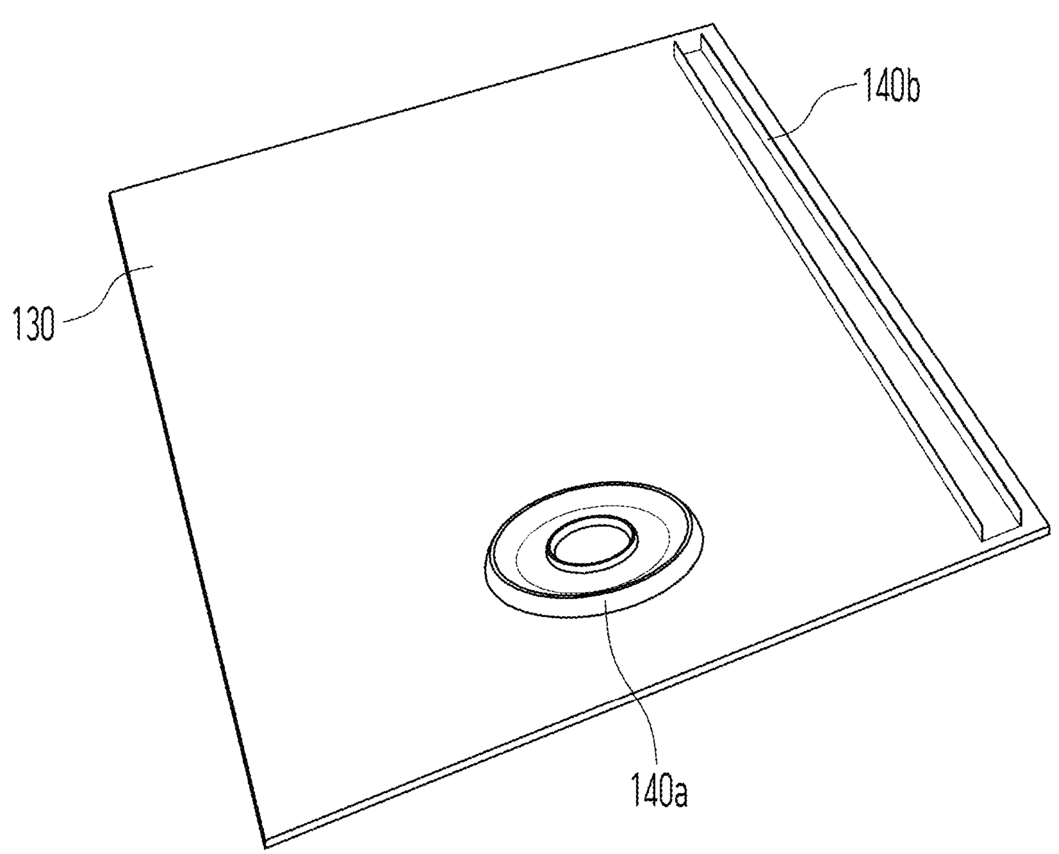
FIG. 6 is a diagram illustrating an example of a display operation device according to another embodiment of the present disclosure.

FIG. 1 is a diagram illustrating an example of a vehicle 200 including a display operation device 100 according to an embodiment of the present disclosure. FIG. 2 is a diagram illustrating an example of a knob 140 attached to a front surface of a cover glass 130 in the display operation device 100 according to an embodiment of the present disclosure. FIG. 3 is a diagram illustrating an example shape of a knob 140 in the display operation device 100 according to an embodiment of the present disclosure. FIG. 4 is a diagram illustrating examples of touch areas 120 in the display operation device 100 according to an embodiment of the present disclosure. FIG. 5 is a diagram illustrating an example of a screen that is output through a display panel 110 in the display operation device 100 according to an embodiment of the present disclosure. FIG. 6 is a diagram illustrating an example of a display operation device 100 according to another embodiment of the present disclosure.

A display operation device 100 according to one embodiment of the present disclosure may include a cover glass 130 and a knob 140. The display operation device 100 may be provided in the vehicle 200. More specifically, the vehicle 200 may include a display panel 110 that is mounted on a holder 210 and includes a touch area 120, and the display operation device 100 may be located at the front surface of the display panel 110.

The display panel 110 may serve to output a screen. The display panel 110 may construct a mutual layer structure along with a touch sensor, or may be formed integrally with the touch sensor, such that the display panel 110 can be implemented as a touchscreen. The touchscreen may provide an input interface between the display panel 110 and the user, and at the same time may provide an output interface between the display panel 110 and the user.

The display panel 110 of the display operation device 100 according to the embodiment of the present disclosure may include a haptic module configured to generate various tactile effects that a user feels, perceives, or otherwise experiences. A typical example of a tactile effect generated by the haptic module may be vibration. The strength, pattern and the like of the vibration generated by the haptic module may be controlled by user selection. For example, the haptic module may output different vibrations in a combining manner or a sequential manner.

Besides vibration, the haptic module included in the display panel 110 for use in the display operation device 100 may generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like. The haptic module may be implemented to allow the user to feel a tactile effect through a muscle sensation such as the user's fingers or arm, as well as transferring the tactile effect through direct contact.

The cover glass 130 may serve to cover the front surface of the display panel 110 including the touch area 120. The knob 140 may be attached to a position corresponding to the touch area 120 on the front surface of the cover glass 130. More specific details regarding the touch area 120 will be described later.

Referring to FIG. 3, the knob 140 for use in the display operation device 100 may include a boundary portion 141 that is formed along a circumference of the knob 140 to demarcate a boundary with the display panel 110. In addition, the knob 140 may include a flat touch portion 142 formed inside the boundary portion 141.

In particular, in the display operation device 100 according to one embodiment of the present disclosure, the boundary portion 141 of the knob 140 may be formed in a convex shape so as to protrude more than the touch portion 142, or may be formed in a concave shape so as to be recessed more than the touch portion 142.

That is, the boundary portion 141 may demarcate a boundary between the knob 140 and the display panel 110 through a convex or concave shape, thereby allowing the user to recognize the position of the knob 140 without having to visually confirm the position of the knob 140. For example, a user may recognize the position of the knob 140 through tactile sense by moving his or her finger. As a result, the user can easily recognize the position of the knob 140 during vehicle driving, so that the ease of display manipulation by the user can be improved.

In addition, in the display operation device 100 according to one embodiment of the present disclosure, the knob 140 may include a circular shape structure. At this time, a touch portion 142 of the knob 140 may include a first touch portion 1421 formed in the center portion of the touch portion 142, a second touch portion 1422 formed outside the first touch portion 1421, and a guide portion 1423 formed between the first touch portion 1421 and the second touch portion 1422 to demarcate a boundary between the first touch portion 1421 and the second touch portion 1422.

In addition, the guide portion 1423 of the knob 140 may be formed in a convex shape so as to protrude more than the first touch portion 1421 and the second touch portion 1422, or may be formed in a concave shape so as to be recessed more than the first touch portion 1421 and the second touch portion 1422.

In addition, referring to FIG. 4, the touch area 120 may recognize the contact of the user who contacts a curved trajectory through the touch portion 142 of the knob 140. In addition, the touch area 120 may recognize how many times the user touches the touch portion 142 and how long the user touches the touch portion 142. To this end, as shown in FIG. 4, the touch area 120 may include a first touch area 120*a* at a position corresponding to the first touch portion 1421 of the knob 140 and a second touch area 120*b* at a position corresponding to the second touch portion 1422.

Based on the above, the method of operating the display operation device 100 according to one embodiment of the present disclosure will be described in detail. The user may turn on or off the display panel 110 by touching the first touch portion 1421. For example, the display panel 110 may be turned on or off depending on the number of times the user touches the first touch portion 1421. In addition, the display panel 110 may be turned on or off depending on the contact time for which the user touches the first touch portion 1421.

In addition, the user may scroll various menus displayed on the display panel 110 by touching the second touch portion 1422 disposed between a guide portion 1423 and a boundary portion 141. For example, the user may move the second touch portion 1422 along a curved trajectory using his or her finger. The second touch area 120*b* corresponding to the second touch portion 1422 may recognize the user's contact along the curved trajectory.

Here, the second touch area 120*b* may be formed to be partitioned along the outer circumference of the first touch area 120*a* to recognize the movement of the user's curved trajectory. For example, as illustrated in FIG. 4, the second touch area 120*b* may be divided into 12 areas at 30-degree intervals, thereby recognizing the user's contact moving along the curved trajectory through the second touch portion 1422.

At this time, referring to FIG. 4 and FIG. 5, information about the user's contact position through the second touch portion 1422 may be displayed on the screen that is output through the display panel 110, and information about the user's contact time obtained through the second touch portion 1422 may be displayed on the screen.

That is, the display operation device 100 may enable the user to visually recognize the contact of the touch portion 142 through a screen output in a form in which the user's contact position or the user's contact time through the touch portion 142 is reflected, as shown in the region A of FIG. 5.

In addition, as described above, the display panel 110 for use in the display operation device 100 may include a haptic module. In addition, the convenience of user's touch operation may be improved through tactile feedback when the user touches the touch portion 142.

In addition, in the display operation device 100 according to one embodiment of the present disclosure, the touch portion 142 may be formed to a predetermined thickness through which the display operation device 100 can recognize a user's contact in the touch area 120 when the user contacts the touch portion 142. This is to enable a touch operation (manipulation) of the display without using an additional configuration by utilizing the touch area 120 of the display panel 110. Therefore, it is preferable that the touch portion 142 be formed as thinly as possible so that the user's contact can be recognized through the touch area 120.

In addition, in the display operation device 100 according to one embodiment of the present disclosure, the knob 140 may include the same material as the cover glass 130. The knob 140 is formed of the same material as the cover glass 130 and is attached to the front surface of the cover glass 130, resulting in implementation of a seamless design.

FIG. 6 is a diagram illustrating another embodiment of the display operation device 100 of the present disclosure, and is intended to explain that the knob 140*a* can be implemented not only in a circular shape as described above, but also in a polygonal shape. FIG. 6 shows a knob 140*b* implemented in a rectangular shape as an example of a polygonal shape. In this case, the user may move his or her finger in a straight trajectory through the knob 140*b* formed in the rectangular shape.

At this time, unlike that shown in FIG. 4, the touch area 120 may be provided on the display panel 110 in a shape corresponding to the rectangular knob 140*b*, and may recognize the user's contact of a straight trajectory. As a result, the user may be able to operate the display by touch using the same principle as described above.

In summary of the above, the display operation device and the vehicle including the same according to the present disclosure may facilitate the operation of the display while providing the user with appropriate operating feeling through the shape of the knob attached to the cover glass covering the front of the display panel.

In addition, the touch operation of the display may be possible without additional configuration by utilizing the touch area of the display panel. In addition, the knob may be formed of the same material as the cover glass to implement a seamless design.

As is apparent from the above description, the display operation device and the vehicle including the same according to the embodiments of the present disclosure can provide a user with appropriate operating feeling while facilitating the operation (or manipulation) of a display through the shape of a knob attached to a cover glass formed to cover a front surface of a display panel.

The display operation device and the vehicle including the same according to the embodiments of the present disclosure can enable a user to touch/operate a display using a touch area of a display panel of the display without using an additional structure.

The display operation device and the vehicle including the same according to the embodiments of the present disclosure can implement a seamless design by forming a knob from the same material as the cover glass.

The above detailed description is to be construed in all aspects as illustrative and not restrictive. The scope of the present disclosure should be determined by reasonable interpretation of the appended claims and all changes coming within the equivalency range of the present disclosure are intended to be embraced in the scope of the present disclosure.

What is claimed is:

1. A display operation device comprising:
a cover glass configured to cover a front surface of a display panel including a touch area; and
a knob on a front surface of the cover glass, wherein the knob is attached to a position corresponding to the touch area,
wherein the knob includes:
a boundary portion along a circumference of the knob to demarcate a boundary with the display panel; and
a flat touch portion inside the boundary portion,
wherein the flat touch portion includes:
a first touch portion at a center portion of the flat touch portion;
a second touch portion outside the first touch portion; and
a guide portion between the first touch portion and the second touch portion to demarcate a boundary between the first touch portion and the second touch portion, and
wherein the guide portion has a convex shape so as to protrude more than both of the first touch portion and the second touch portion, or the guide portion has a concave shape so as to be recessed more than both of the first touch portion and the second touch portion.

2. The display operation device according to claim 1, wherein:
the flat touch portion has a predetermined thickness to enable recognition of a user's contact in the touch area when the user touches the flat touch portion.

3. The display operation device according to claim 2, wherein:
the knob includes the same material as the cover glass.

4. The display operation device according to claim 1, wherein:
the boundary portion has a convex shape so as to protrude more than the flat touch portion, or the boundary portion has a concave shape so as to be recessed more than the flat touch portion.

5. The display operation device according to claim 1, wherein:
the knob includes a structure having a circular shape; and
the touch area is configured to recognize a contact action of a user who contacts a curved trajectory through the flat touch portion.

6. The display operation device according to claim 5, wherein:
the touch area is configured to recognize a number of times the user touches the flat touch portion and a duration of the user touching the flat touch portion.

7. The display operation device according to claim 1, wherein:
the knob includes a structure having a polygonal shape; and
the touch area is configured to recognize a contact of a user who touches a straight trajectory through the flat touch portion.

8. A vehicle comprising:
a vehicle body;
a holder located at the vehicle body;
a display panel mounted on the holder and including a touch area; and
a display operation device located at a front surface of the display panel,
wherein the display operation device includes:
a cover glass covering the front surface of the display panel; and
a knob on a front surface of the cover glass, wherein the knob is attached to a position corresponding to the touch area,
wherein the knob includes:
a boundary portion along a circumference of the knob to demarcate a boundary with the display panel; and
a flat touch portion inside the boundary portion,
wherein the flat touch portion includes:
a first touch portion at a center portion of the flat touch portion;
a second touch portion outside the first touch portion; and
a guide portion between the first touch portion and the second touch portion to demarcate a boundary between the first touch portion and the second touch portion, and
wherein the guide portion has a convex shape so as to protrude more than both of the first touch portion and the second touch portion, or the guide portion has a concave shape so as to be recessed more than both of the first touch portion and the second touch portion.

* * * * *